US007454911B2

(12) United States Patent
Tafas

(10) Patent No.: US 7,454,911 B2
(45) Date of Patent: Nov. 25, 2008

(54) ENERGY RECOVERY SYSTEM IN AN ENGINE

(76) Inventor: Triantafyllos P. Tafas, 9 Clemens Ct., Rocky Hill, CT (US) 06067

( * ) Notice: Subject to any disclaimer, the term of this patent is extended or adjusted under 35 U.S.C. 154(b) by 109 days.

(21) Appl. No.: 11/266,948

(22) Filed: Nov. 4, 2005

(65) Prior Publication Data
US 2007/0101716 A1 May 10, 2007

(51) Int. Cl.
*F01K 23/10* (2006.01)
(52) U.S. Cl. ........................................................ 60/618
(58) Field of Classification Search ................ 60/618, 60/619, 617; *F01K 23/10*
See application file for complete search history.

(56) References Cited

U.S. PATENT DOCUMENTS

| | | | | |
|---|---|---|---|---|
| 2,122,280 | A * | 6/1938 | Diedrich | 60/618 |
| 2,360,969 | A * | 10/1944 | Newcombe | 60/618 |
| 4,334,409 | A * | 6/1982 | Daugas | 60/618 |
| 4,366,674 | A * | 1/1983 | Eakman | 60/618 |
| 4,394,582 | A * | 7/1983 | Kreissl et al. | 60/618 |
| 4,439,999 | A | 4/1984 | Mori et al. | |
| 4,513,572 | A * | 4/1985 | Bonnaud | 60/618 |
| 4,586,338 | A * | 5/1986 | Barrett et al. | 60/618 |
| 4,803,958 | A | 2/1989 | Erickson | 122/21 |
| 4,996,845 | A * | 3/1991 | Kim | 60/618 |
| 5,133,298 | A * | 7/1992 | Ahnger | 60/618 |
| 5,339,632 | A | 8/1994 | McCrabb et al. | 60/618 |
| 5,609,029 | A * | 3/1997 | Ahnger et al. | 60/618 |
| 6,089,020 | A * | 7/2000 | Kawamura | 60/618 |
| 6,119,457 | A | 9/2000 | Kawamura | 60/618 |
| 6,880,344 | B2 | 4/2005 | Radcliff et al. | 60/618 |
| 6,910,333 | B2 | 6/2005 | Minemi et al. | 60/618 |
| 6,948,316 | B2 | 9/2005 | Minemi et al. | 60/670 |
| 2003/0005696 | A1* | 1/2003 | Wilson | 60/618 |
| 2004/0088985 | A1 | 5/2004 | Brasz et al. | 60/670 |
| 2004/0088986 | A1 | 5/2004 | Brasz et al. | 60/651 |
| 2004/0088993 | A1 | 5/2004 | Radcliff et al. | 60/772 |
| 2005/0166607 | A1 | 8/2005 | Brasz et al. | 62/114 |
| 2005/0262842 | A1* | 12/2005 | Claassen et al. | 60/618 |
| 2006/0179842 | A1 | 8/2006 | Brasz et al. | 60/651 |
| 2007/0007771 | A1 | 1/2007 | Biddle et al. | 290/7 |

FOREIGN PATENT DOCUMENTS

| EP | 205194 | A2 * | 12/1986 |
|---|---|---|---|
| JP | 55043205 | A * | 3/1980 |
| JP | 61244806 | A * | 10/1986 |
| JP | 5179972 | | 7/1993 |
| JP | 6033707 | | 2/1994 |

* cited by examiner

*Primary Examiner*—Thai-Ba Trieu
(74) *Attorney, Agent, or Firm*—Kelley Drye & Warren LLP

(57) ABSTRACT

Energy recovery system and method of using the same. The system is configured to capture the dissipated waste heat by an internal combustion engine and convert the same into electrical energy.

4 Claims, 2 Drawing Sheets

ENERGY RECOVERY SYSTEM IN AN ENGINE

FIELD OF INVENTION

The present invention includes an energy capture system and method for recovering heat energy from the exhaust gases of an internal combustion engine, and conversion thereof into other forms of energy, in particular electrical energy.

BACKGROUND OF INVENTION

In conventional internal combustion engines, a mixture of air and fuel is introduced into the engine, where it is compressed and then ignited. The burning gases expand, do work, and then are expelled from the engine. The actual amount of kinetic energy or mechanical work that is extracted from the internal combustion generally depends upon the thermal efficiency of the internal combustion engine. What is not extracted is expended as waste heat.

Thermal efficiency is the percentage of energy taken from the combustion which is actually converted to mechanical work. In a typical low compression engine, the thermal efficiency may be only about 26%. In a highly modified engine, such as a race engine, the thermal efficiency may be about 34%.

In a generic internal combustion engine, only 20% of the total energy available may be converted to useful energy. Of the remaining 80% of the total energy, approximately 38% may be lost through exhaust heat, 36% through water heating in the cooling system and 6% through motor friction.

There have been various schemes to capture energy from the exhaust gases and heated engine cooling water.

U.S. Pat. No. 4,439,999, Mori, et al., discloses an internal combustion engine and an absorption type refrigeration system which makes use of both the engine exhaust gas and the heated engine cooling water. The internal combustion engine and the absorption type refrigeration system are combined in such a manner that the exhaust gas of the internal combustion engine is utilized as the heat source for a first gaseous refrigerant generator having the highest operating temperature in the system, while heated engine cooling water is utilized as the heat source for another generator which operates at a temperature lower than the operating temperature of the first gaseous refrigerant generator.

U.S. Pat. No. 6,119,457 to Kawamura describes a heat exchange apparatus having high and low temperature heat exchangers comprising porous material provided in an exhaust passage from a ceramic engine in communication with a supercharger connected to the ceramic engine. The heat exchange apparatus comprises a high temperature heat exchanger having a steam passage provided in an exhaust gas passage through which an exhaust gas passes whereby steam is heated, and a low temperature heat exchanger provided in the portion of the exhaust gas passage on the downstream side of the high temperature heat exchanger which has a water passage for heating water by the exhaust gas. The ceramic engine has a steam turbine type supercharger provided with a steam turbine driven by the steam from the high temperature heat exchanges, a compressor, and a condenser which separates a fluid discharged from the steam turbine into water and low temperature steam. Pressurized air from the compressor is supplied to the combustion chamber, which presses down a piston to carry out compression work during an intake stroke. Thus, the supercharger is driven by the thermal energy recovered from an exhaust gas by the same heat exchanger apparatus.

An example of an energy recovery system is also disclosed in Japanese Patent Laid-Open No. 179972/1993. This energy recovery system has an energy recovery unit provided with a first turbine installed in an exhaust passage and a generator operated by the first turbine, a turbocharger provided with a second turbine connected to an outlet-side passage of the first turbine and a supercharging compressor operated by the second turbine, and a waste gate provided in the outlet-side passage of the first turbine. The energy recovering operation is carried out by the energy recovery unit when the temperature of the exhaust gas is high.

Exhaust gas energy from an internal combustion engine may also be used to provide a heated water source, for example, while the mechanical power of the engine may be used simultaneously to generate electricity. In Japanese Patent Laid-Open No. 33707/1994, there is disclosed a system making use of exhaust gas energy from a turbocharger attached to a heat insulation type gas engine to produce steam that is used to drive a steam turbine so as to produce electric energy and heated water. A turbocharger is driven by the exhaust gas energy from the heat insulating gas engine, and the generator/energy recovery unit is driven by the exhaust gas energy from the turbocharger. The thermal energy of the exhaust gas directed to the energy recovery unit is converted into steam by a first heat exchanger, and recovered as electric energy by driving a steam turbine. Heated water is generated by the high-temperature steam from the steam turbine by an operation of a second heat exchanger, and utilized as a hot water supply source.

In U.S. Pat. No. 4,803,958 to Erickson, there is disclosed an open-cycle absorption apparatus for compressing steam from a low pressure to a higher pressure. The apparatus is used for upgrading low-temperature jacket-cooling heat from an internal combustion engine to useful pressure steam. A simple heat-exchange apparatus is involved, using the extra temperature availability of the hot exhaust gas as the driving medium.

There have recently been higher efficiency vehicles powered using hybrid concepts that involve internal combustion engines in combination with an electric generator that powers an electric motor. The generator utilizes some of the kinetic energy that would otherwise be converted into heat by friction in the vehicle's braking system. While systems such as described above in combination with such hybrid systems may further improve energy storage in such cars, the loss of energy through the emission system would remain high. What is needed is a system that would convert a significant percentage of the power lost as heat to electrical power and create a more efficient hybrid vehicle.

SUMMARY OF INVENTION

The disclosed system comprises an energy recovery system in internal combustion engines.

In a first embodiment, the energy recovery system comprises a steam generating chamber located proximal to the engine, such as immediate contact with the exhaust manifold, that is operatively configured to receive exhaust fumes from one or more combustion chambers in the internal combustion engine and one or more fluids from a fluid reserve and to convert such fluid into steam. In such embodiment, the steam generated in the steam chamber is directed through a steam inlet to an electrical generator component comprising a turbine and electrical generator. The electrical generator component is operatively configured with respect to the steam inlet such that the steam turns the turbine which in turn causes the generator to generate electricity. The electricity produced may be used by the engine contemporaneously or stored for later use, for example, when the engine is not using combustion to generate rotation of the wheels on a hybrid vehicle.

In one embodiment, the system involves a heat collection system proximal to an internal combustion engine block, the heat collection system configured to transfer heat to a steam generating boiler. Both the steam and exhaust gases simultaneously drive a turbine of an electric generator which in turn is connected to an electric motor. The power from the electric motor supplants the power from the internal combustion engine to propel a vehicle, for example. In one embodiment, the heat collection system is immediately proximal to the engine, such as connected to the manifold.

Aspects disclosed herein include:

An internal combustion engine system comprising an internal combustion engine producing heated emissions from one or more combustion chamber(s); a steam generator connected proximal to the combustion chamber(s), the steam generator operatively configured to receive the heated emissions from the one or more combustion chamber(s) and to apply the heat from the heated emissions to produce steam, and configured to direct the steam towards a turbine in a manner to cause the turbine to turn; an electric generator operatively connected to the turbine, the electric generator operatively configured to produce electricity upon turning of the turbine.

An energy recovery system comprising an engine having a combustion chamber; a coolant subsystem communicating with the combustion chamber; an exhaust subsystem integral to the combustion chamber; a boiler in communication with the coolant subsystem, the boiler operatively configured to generate steam in cooperation with the coolant subsystem; an energy converter operatively configured to simultaneously receive the steam from the boiler and to receive the exhaust gases from the exhaust subsystem and to convert energy associated with the steam and exhaust gases into mechanical energy; an electric generator in communication with the energy converter operatively configured to convert the mechanical energy from the energy converter to electrical energy, wherein the engine and the electric generator are cooperatively configured to propel a vehicle.

An energy recovery system comprising an engine having a combustion chamber producing hot pressured exhaust gases; an energy collection subsystem housing a liquid energy carrier medium, the energy collection subsystem operatively configured to allow heat from the hot pressured exhaust gases of the combustion chamber to pass into the liquid energy carrier medium; an energy chamber connected to the energy collection subsystem operatively configured to convert the energy carrier medium from a liquid to a gaseous state; a combustion exhaust subsystem integral to the combustion chamber, the combustion exhaust subsystem operatively configured to receive hot pressured exhaust gases from the combustion chamber; an energy converter operatively configured to communicate simultaneously with the energy chamber and with the combustion exhaust subsystem, the energy converter having a shaft operatively configured to be rotated by the energy carrier medium in a gaseous state and to convert pressure energy from the exhaust gases in the combustion exhaust system into mechanical power; a converter attached to the energy converter operatively configured to convert the mechanical power of the energy converter to electrical power; wherein the engine and the converter are configured to provide energy to propel a vehicle.

A method of recovering waste heat energy from exhaust gases produced by combustion in an internal combustion engine, the method comprising the steps of: transferring heat from the engine to a primary coolant loop; directing exhaust gases from the engine to a first impeller in a first chamber connected to a shaft operatively connected to an electric generator; directing the exhaust gases from the first chamber to an exhaust pipe; transferring heat from the exhaust pipe to a heat conducting member connected to a secondary cooling loop; transferring heat from the primary and secondary cooling loops to a second chamber operatively configured to produce steam; directing steam from the second chamber to a second impeller operatively connected to the shaft operatively connected to the first impeller, the second chamber being positioned in a third chamber; directing the steam from the third chamber to a condenser operatively configured to condense the steam to liquid; directing the liquid from the condenser to the primary cooling circuit.

DETAILED DESCRIPTION

Figure 1:
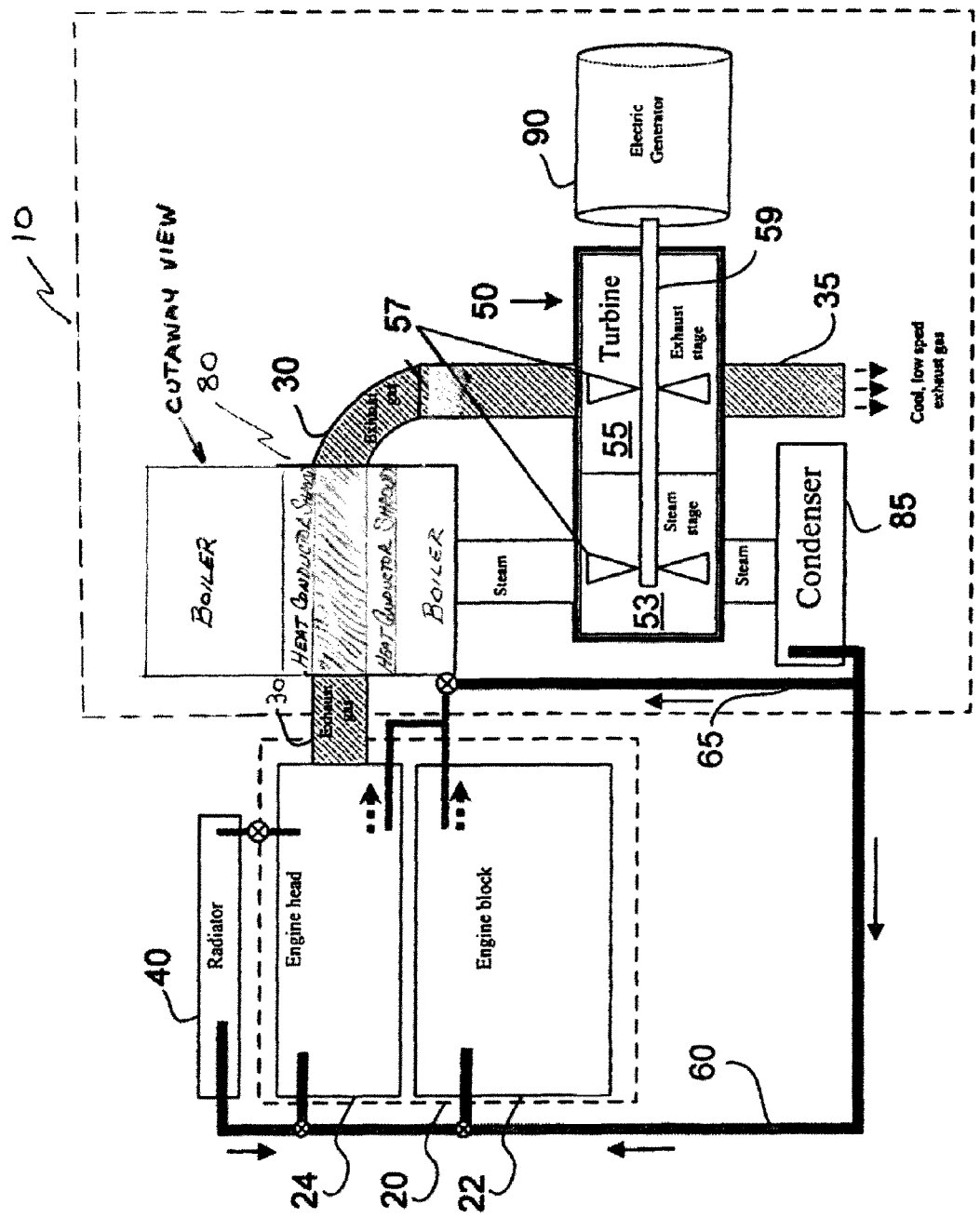
FIG. 1 is a drawing showing the integration of components of an embodiment energy recovery system, including a heat collection subsystem and a heat expending exhaust subsystem, as well as a two-stage turbine that interfaces with the two subsystems simultaneously.

In an embodiment shown in FIG. 1, there is illustrated an energy recovery system 10 for an internal combustion engine 20. Internal combustion engine 20 is powered by the expansion of hot combustion products of fuel directly combusted within the engine. As is known, a piston internal combustion engine works by burning hydrocarbon or hydrogen fuel that presses on a piston, which does work, such as propelling an automobile; and a jet engine works as the hot combustion products press on the interior parts of the nozzle and combustion chamber, directly accelerating the engine forwards. The engine of such embodiment may be a gasoline or diesel engine, for example, a two-cycle, four-cycle or a rotary Wankle engine. Energy recovery system 10 shown in FIG. 1 is configured to capture and convert specific energy, that is, the amount of energy per unit mass of the fuel burned in engine 20 into useful work that is otherwise wasted, for example, in the form of heat that escapes into the environment.

Figure 2:
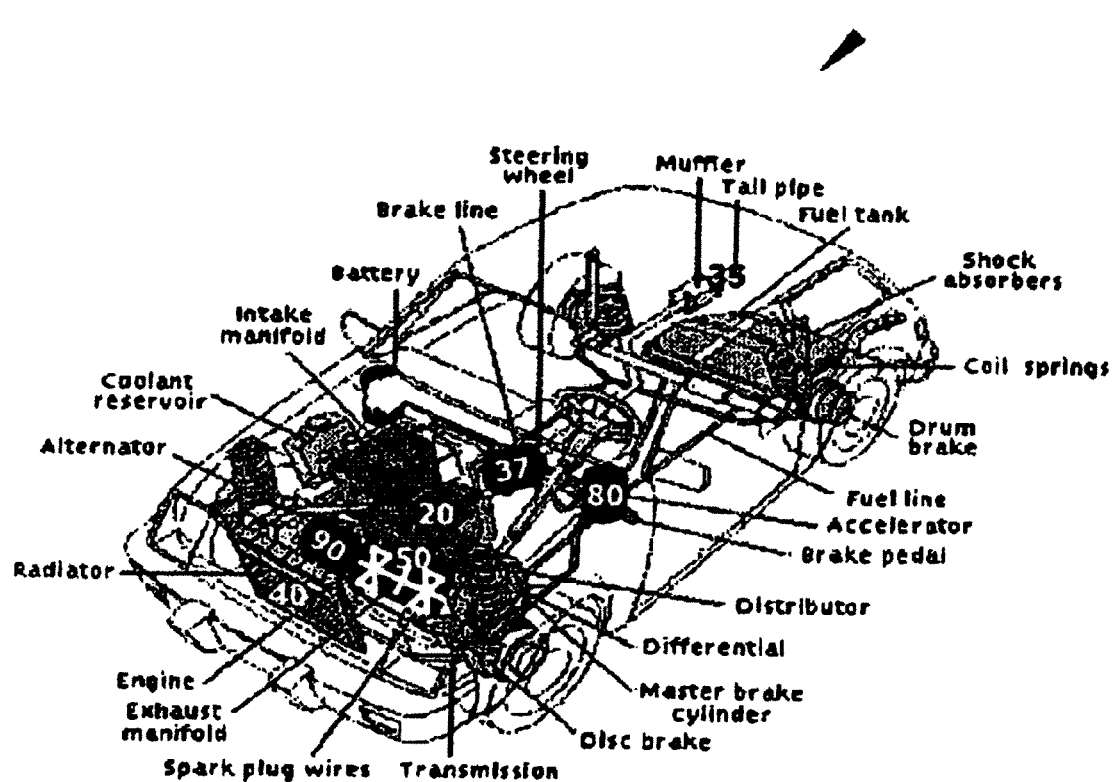
FIG. 2 is a drawing showing the incorporation of the energy recovery system of FIG. 1 in an automobile, according to an embodiment of the present invention.

In certain internal combustion engines, only a portion (about 20%) of the total available specific energy in the consumed fuel is directly converted to mechanical work by the action of the hot combustion products on engine components such as pistons (which maybe connected to a shaft, which in turn may do work such as rotating the wheels on a car—shown in FIG. 2). Of the remaining portions of energy lost through exhaust gases 30 and through water heating in the radiator 40 are converted to useful work through the use of a two-stage turbine 50 as shown in FIG. 1.

In an aspect of an embodiment, the two-stage turbine 50 is configured to operate with impellers 57 that are mounted onto a common shaft 59 which spans two chambers 53 and 55, and which drives an electric generator 90 as shown in FIG. 1. The impellers are rotatable by gaseous matter such as the exhaust gases issuing from exhaust subsystem 30 and steam issuing from exhaust heat conductor 80, as explained further below. Alternatively, only one impeller may be employed with rotation by gaseous inflow or steam alone, or both gaseous inflow and steam. The electricity generated by generator 90 provides additional energy recovered from the otherwise would-be wasted heat energy to be put into useful work. It will be appreciated by those skilled in the art that this additional energy recovered from waste heat alone can supplant the energy recovered from kinetic energy dissipated in the braking system of an automobile, and hence, can be used to enhance the current hybrid technologies for automobiles. The efficiency of current internal combustion engines may be significantly improved thereby, for example, by a factor of two or more.

Another embodiment of the present invention involves pick-up of heat and exhaust gas from engine block 22 and engine head 24 (shown separate from the engine block for purposes of illustration) at points closest to the heat source generated by the combusting fuel in combustion chambers of engine block 22 in FIG. 1. The main cooling circuit comprises a primary loop 60 (shown in solid line arrows) which circulates a coolant (such as water). Exhaust heat conductor 80 generates steam which enters chamber 53 of the two-stage turbine 50 to turn shaft 59 connected to electric generator 90. In one aspect, the electricity from generator 90 may be used to increase steam production from exhaust heat conductor 80. The expended steam is then collected at condenser 85 where another phase change occurs from steam to liquid, thus completing the first cooling loop 60, as shown in FIG. 1.

In another aspect, a secondary loop 65 picks up condensed steam from condenser 85 (shown in FIG. 1). Exhaust 30 from internal combustion engine 20 is directed to chamber 55 where the high-pressure hot gases perform work on the turbine shaft 59, and leave the system through exhaust pipe 35. A shroud over exhaust pipe 35 may be configured to augment (using highly thermal conductive ceramic heat sinks, for example) heat conduction from the exhaust gases to the secondary loop 65. In one aspect, secondary loop 65 is connected ultimately to exhaust heat conductor 80. Valves may be used to adjust and balance the coolant flow through loops 60 and 65. Relatively cool and low speed exhaust gases may leave the system through exhaust pipe 35 as shown in FIG. 1.

Various aspects of certain embodiments of the present invention may be superimposed schematically over the various known components of an automobile 100 as depicted in FIG. 2 and the labeled known components are not described here so as to not obscure the key aspects of the present invention. The cooling loops are not shown as they can be arranged in any number of ways to connect the components of embodiments, for example, engine block 22, exhaust heat conductor 80, condenser 85, radiator 40, two-stage turbine 50, electric generator 90 and exhaust pipe 35. Electricity generated by electric generator 90 can be used to power the drive of the car, or power any component of the car, or the electricity can be stored in the car battery or secondary storage battery 37. It will be understood that the placement of the disclosed new components can be varied dependent upon factors affecting space, and safety considerations of an automobile. It will also be obvious to those skilled in the art that the energy recovery system disclosed herein can be applied to improve the efficiency of any engine used to produce useful work.

In operation, an embodiment of a method of recovering waste heat energy in an internal combustion engine 20 involves transferring the heat developed in internal combustion engine 20 to primary cooling loop 60 at the closest points to the combusting fuel in the chambers (as, for example, receiving emissions directly from the exhaust manifold) (see, FIG. 1). The heat carrying coolant fluid, for example, water in loop 60 is directed to a suitably designed exhaust heat conductor 80 where the fluid is heated to generate advantageously pressured steam. Steam is next allowed to enter two-stage turbine 50 to drive impeller 57 mounted on shaft 59, which in turn drives electric generator 90. The expended steam is then condensed into liquid through a second phase change in condenser 85. The coolant liquid then completes the circuit back to engine block 22 joining primary cooling loop 60. The method may involve circulating the coolant through the engine block 22 as well as the engine head 24 to promote most efficient energy recovery from the combusting fuel in combustion engine 20.

In an aspect of an embodiment, the method also involves directing the exhaust gases 30 to the two-stage turbine 50 as shown in FIG. 1. The high speed exhaust gases are directed to impart energy to another impeller 57 of the turbine which further enhances the rotation of shaft 59, which in turn drives the electric generator 90. Before the expended gases are ejected out into the environment via an exhaust pipe 35, any remaining heat energy may be extracted by means of further heat conducting elements and then transferred appropriately into the system as, for example, into secondary loop 65.

In another embodiment, exhaust gas may pass first from the turbine exhaust stage and subsequently be channeled to exhaust heat conductor 80.

EXAMPLE 1

The exhaust from the exhaust manifold of a single piston outboard motor is directed to a water-jacketed chamber. The temperature of the exhaust and the water in the jacket is measured by way of thermocouples during the combustion of 100 ml of regular gasoline. Steam is generated with maximum temperatures over 400° C. measured in the gas exhaust.

While the invention has been particularly shown and described with reference to a particular embodiment(s), it will be appreciated that variations of the above-disclosed embodiments(s) and other features and function, or alternatives thereof, may be desirably combined into many other different systems or applications Also that various presently unforeseen and unanticipated alternatives, modifications, variations or improvements therein may be subsequently made by those skilled in the art which are also intended to be encompassed by the following claims.

What is claimed is:

1. An energy recovery system configured to propel a vehicle comprising:
    an engine comprising an engine block containing at least one combustion chamber;
    a coolant subsystem, said coolant subsystem comprising a network of coolant fluid conduits in thermal communication with said combustion chamber and containing coolant fluid, said coolant subsystem operatively configured to directly transfer heat from said combustion chamber via said coolant fluid;
    an exhaust subsystem, said exhaust subsystem comprising at least one conduit in communication with said combustion chamber and operatively configured to convey exhaust gases;
    a boiler in communication with said coolant subsystem, said boiler operatively configured to generate steam in cooperation with the coolant subsystem;
    an energy converter comprising a single two-chamber turbine having a first chamber connected to said exhaust subsystem operatively configured to transform energy of said exhaust gases into first mechanical energy and a second chamber connected to said boiler operatively configured to transform energy of said steam into second mechanical energy; and an electric generator in communication with said energy converter operatively configured to convert said first and second mechanical energies to electrical energy.

2. The energy recovery system in accordance with claim 1, wherein said single two-chamber turbine further comprises a rotatable shaft that spans both said first chamber and said second chamber, and is connected to said electric generator.

3. An energy recovery system configured to propel a vehicle comprising:
- an engine having a combustion chamber producing hot pressured exhaust gases and heat;
- an energy collection subsystem housing a liquid energy carrier medium, said energy collection subsystem operatively configured to allow heat directly transferred from of said combustion chamber to pass into said liquid energy carrier medium;
- a boiler connected to said energy collection subsystem operatively configured to convert said energy carrier medium from a liquid to a gaseous state;
- an energy converter, said energy converter comprising a single two-chamber turbine and operatively configured to communicate simultaneously with said chamber boiler and with said combustion exhaust subsystem, said energy converter having a shaft operatively configured to be rotated by said energy carrier medium in a gaseous state and to convert pressure energy from said exhaust gases in said combustion exhaust system and said energy carrier medium from a liquid to a gaseous state into mechanical power; and
- an electric generator attached to said energy converter operatively configured to convert the mechanical power of said energy converter to electrical power.

4. The energy recovery system in accordance with claim 3, wherein said single two-chamber turbine comprises a first chamber for receiving exhaust gases from said exhaust subsystem and a second chamber for receiving said liquid energy carrier medium from said boiler.

* * * * *